United States Patent
Khandelwal et al.

(10) Patent No.: US 7,119,675 B2
(45) Date of Patent: Oct. 10, 2006

(54) EMERGENCY ALERT SERVICE

(75) Inventors: Rajesh Khandelwal, Bridgewater, NJ (US); Sathya Narayanan, Plainsboro, NJ (US); Luyang Li, South Plainfield, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 477 days.

(21) Appl. No.: 10/765,760

(22) Filed: Jan. 27, 2004

(65) Prior Publication Data

US 2005/0162267 A1    Jul. 28, 2005

(51) Int. Cl.
*G08B 1/00*    (2006.01)
(52) U.S. Cl. .................. 340/531; 340/506; 340/539.1; 340/539.18; 340/500; 340/3.43; 340/7.29; 709/223; 709/224; 709/218; 370/356; 370/328
(58) Field of Classification Search ............... 340/531, 340/506, 539.1, 539.18, 500, 3.43, 7.29; 709/223, 224, 218; 370/356, 328
See application file for complete search history.

(56) References Cited

U.S. PATENT DOCUMENTS 6,930,598 B1*    8/2005    Weiss .................... 340/531
2002/0037004 A1*    3/2002    Bossemeyer et al. ....... 370/356

* cited by examiner

*Primary Examiner*—Tai Nguyen
(74) *Attorney, Agent, or Firm*—Harness, Dickey & Pierce, PLC

(57) ABSTRACT

The emergency alert service responds to receipt of emergency alert messages by filtering, formatting and routing emergency alert information to a variety of different networked appliances and also to remote devices. In this way, a consistent warning message is disseminated simultaneously over many different warning systems, thus increasing warning effectiveness while simplifying the warning task. The system thus provides a common alerting protocol that is simple but quite robust and capable of exchanging all-hazard emergency alerts and public warnings over all kinds of networks.

24 Claims, 3 Drawing Sheets

EMERGENCY ALERT SERVICE

BACKGROUND OF THE INVENTION

The present invention relates generally to facilities for providing emergency alert messages over public broadcast and other information dissemination systems. More particularly, the invention relates to an improved emergency alert system that integrates with network-attached appliances in local area network and home network environments to facilitate delivery of the emergency alert message even when the emergency alert monitor system is turned off or in sleep mode.

The Federal Communications Commission (FCC) currently mandates support for Emergency Alert Messages (EAM) in receivers. In analog systems, the emergency alert message is typically embedded in the signal itself. In digital systems the emergency alert messages are typically sent via the in-band transport stream. In the cable environment, emergency alert messages may also be carried in the out-of-band (OOB) channel.

Currently, once an emergency alert message is received by a receiver (analog or digital) it is decoded and annunciated. Where a display monitor is provided, annunciation of the message may be as a displayed text message. Where an audio monitor is provided, the message annunciation may be provided in audio form. In either case, however, if the monitor happens to be switched off at the time the emergency alert message is received, the message is lost. For example, if an emergency alert message is broadcast for display on a consumer's television set, and that television set is switched off, the consumer does not receive the alert message.

There are also some types of receiver equipment that employ a power saving mode or standby mode. When such a receiver is in such power saving mode or standby mode, the emergency alert message is likewise not received. Currently there is no mechanism to notify the user or consumer when such messages are broadcast but not received.

SUMMARY OF THE INVENTION

The aforementioned problems with current emergency alert messaging systems are addressed through an emergency alert service whereby networked appliances register or subscribe to the service and are thereafter provided with redirected or redistributed messages that can be used to provide emergency alert information to the user through the networked appliance, either instead of through the conventional emergency alert monitor, or in addition to it. The emergency alert service may also be configured to provided turn-on or wake-up commands to the emergency alert monitor to thereby address the aforementioned problem when the monitor is switched off or in power saving or standby mode. In addition, the emergency alert service may be configured to provide redirected alert messages to other remote devices, such as instant messaging terminals or computers communicating through the internet, cellular telephones, and the like. In this regard, the emergency alert service may be configured to perform a user tracking function that can automatically ascertain the user's current location and message receiving capabilities and will then redirect the alert message to the user at that location, or message annunciation in whatever form the user's current device capabilities happen to be. Thus, if the user is away from the home and carrying a cellular telephone, the emergency alert service will forward an alert message to the user's cellular phone, in a suitable format that can be presented on the cellular phone hardware. Such presentation could include, a special alert ring sequence, followed by a prerecorded alert voice message and/or a text message displayed on the cellular phone's digital display.

For a more complete understanding of the invention, its objects and advantages, reference may now be had to the accompanying drawings and to the remaining specification.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
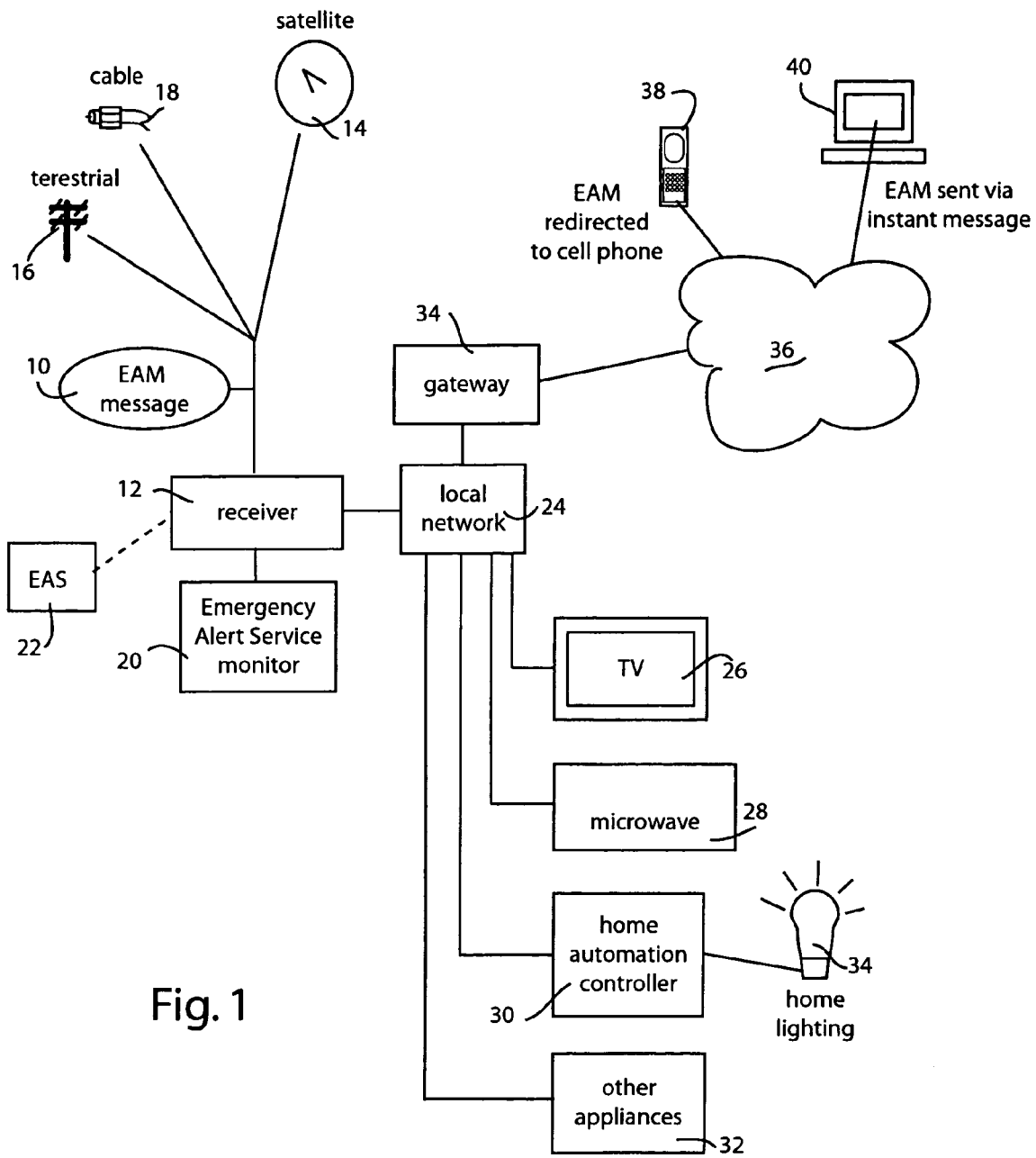
FIG. 1 is a block system diagram illustrating the system components that may be used to implement the emergency alert system.

Referring to FIG. 1, the emergency alert service of the invention will be described in an exemplary application where the emergency alert message 10 is initially received by a receiver 12. The emergency alert message can be in a variety of formats, including text messages, audio messages, video messages, other multimedia messages, and combinations thereof. The emergency alert messages can be disseminated from a variety of different sources. In FIG. 1, three possible sources have been illustrated. These include satellite 14, terrestrial 16 and cable 18. As previously discussed, the emergency alert message can be in either analog or digital form. When in analog form, the emergency alert message (EAM) is usually embedded in the signal itself. In digital form, the EAM may be sent via the in-band transport stream. In a cable environment, the EAM may also be carried in the out-of-band (OOB) channel.

Receiver 12 may have an associated monitor or annunciator that forms an integral part of the receiver itself. Alternatively, the monitor or annunciator can be a separate unit that is coupled to the receiver. In FIG. 1, a separate monitor or annunciator has been illustrated at 20. It will, of course, be understood that the monitor or annunciator 20 could be integral with receiver 12 or packaged as a separate unit.

The emergency alert service of the invention may be implemented as a software application in receiver 12, or in some other component within a computer network. For illustration purposes, FIG. 1 depicts the emergency alarm service 22 as residing in the receiver 12. Such an implementation can be as an unbound JAVA or native application that runs using the processor and suitable memory within receiver 12. In such case, all of the functionality of the emergency alert service is in this application. In other embodiments, the emergency alert service application may be distributed on the receiver (or on some other component) and may be configured to collaborate with other emergency service software application collocated on the received or elsewhere in the network.

The emergency alert service 22 is designed to communicate with other devices, and in this regard, a local network, such as a local area network or home network may be provided, as illustrated at 24. Receiver 12 may be coupled to local network 24 and this coupling may be used, as described more fully below, to distribute or redirect alert messages to networked appliances and other remote devices. In a business or office application, the local network 24 will be typically connected to a plurality of computer workstations upon which the alert messages may be displayed. In a home network application, the local network 24 may be coupled to networked appliances found within the home. These may include appliances such as television 26, microwave oven 28, home automation controller 30 as well as other appliances (such as kitchen appliances, home automation systems, telephone switching systems, and the like) depicted generally at 32. The home automation controller, for example, may be used to control home lighting as at 34. Such systems commonly use a power line communication protocol such as the X-10 protocol to turn home lights and other devices on and off under software control. In the present application, the home automation controller could be used to flash the home lighting on and off in a particular pattern to alert a user when an emergency alert message is incoming.

The local network 24 may be coupled to a suitable gateway 34, giving access to the internet 36 as well as to other communication infrastructures such as a cellular telephone infrastructure. Through gateway 34 alert messages can be redirected to remote devices such as a cellular telephone 38 and to a computer terminal 40 used to receive instant messages.

Figure 2:
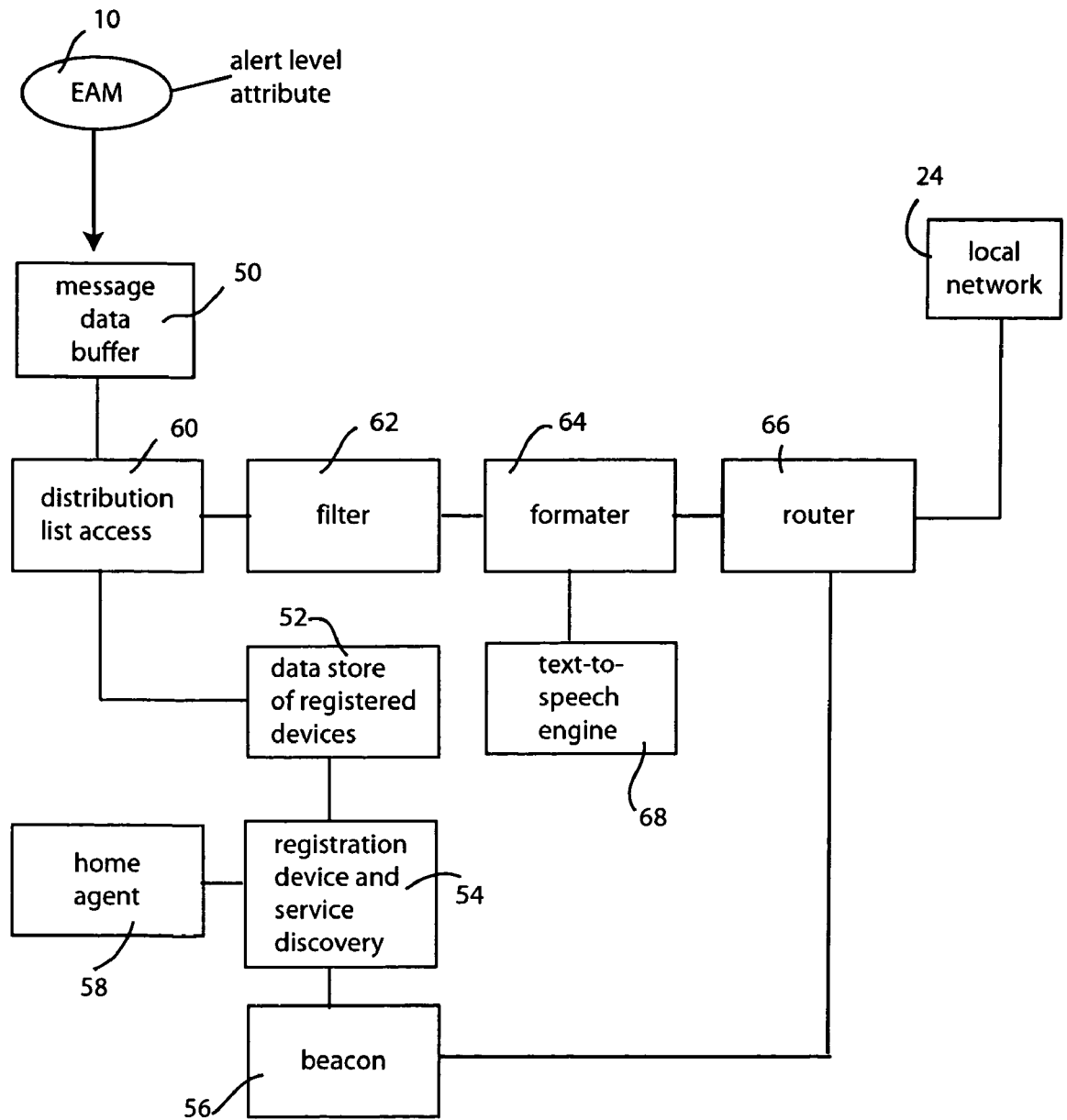
FIG. 2 is a block diagram illustrating a software embodiment of the emergency alert system.

The emergency alert service can be physically and logically implemented in a variety of ways. An exemplary framework or architecture is illustrated in FIG. 2. The architecture of FIG. 2 can be implemented as software components or modules which can be deployed at any suitable location within the network or information system.

Referring to FIG. 2, incoming emergency alert messages (EAM) 10 may be stored in a message data buffer 50. The EAM can have an alert level attribute that the system can use to determine which devices or appliances should annunciate a particular alert message. The user may configure the system to screen or filter out certain alert messages such as messages having a predetermined low alert level attribute. By way of example, the user might wish to be notified of severe storm warnings but might elect to have alert messages regarding ozone air quality levels or sun exposure levels filtered out.

The emergency alert system architecture or framework includes a data store of registered devices 52 which may be used to store information about each device that may be called upon to annunciate alert messages. The data store 52 is populated using a registration module 54 that performs device and service discovery functionality. A beacon module 56, associated with the registration module 54, periodically sends out a broadcast over the local network 24 that devices on the network can respond to in order to register with the emergency alert service. The registration module 54 can also be provided with a home agent module 58, through which the user can input information about his or her travel plans. The user can thus enter information into data store 52 that the emergency alert service uses to forward or redirect emergency alert messages to remote devices in the possession of the user or at the location where the user has planned to visit.

Incoming EAM messages are stored in message data buffer 50 where they are then examined by a distribution list access module 60. This module consults the data store 52 to determine which devices or appliances have registered to receive EAM messages. The distribution list access module 60 also examines the alert level attribute of the message in the data buffer 50 to identify which messages should be passed to which devices and which messages should be filtered out. Messages are thus filtered by module 62 to eliminate those which the user has designated based on alert level attribute. The messages are filtered for each device or appliance separately. Thus, for example, all alert messages may be displayed on the television monitor, but only high level alert messages cause the home lighting to flash the lights in an alert pattern.

The filtered messages are then passed to the formatter module 64 which constructs messages for each device that is to receive the message (based on the distribution list access operation). A variety of different formatting options are possible in this regard. In one embodiment all devices on the network may be designed to handle a predefined or unified message format. In such case, the formatter 64 puts all messages into this unified format. In an alternate embodiment, where the devices and appliances are not all designed to handle a unified format, the formatter module 64 will prepare custom formatting that is suited for each device or appliance. Some devices are designed to display text messages; other devices may be designed to handle audio or video or multimedia messages. The formatter module handles all of these. In addition, the formatter can be provided with a text-to-speech engine 66. The text-to-speech engine converts text messages into synthesized speech messages, allowing text alerts to be played on audio systems.

After the messages have been filtered and formatted they are passed to the router module 66. The router uses information stored within the data store 52 that identifies the address or URL of each appliance or device. In this way, the router 66 selectively routes properly formatted alert messages to the correct devices on the network. Such routing can include routing messages to the gateway 34 (FIG. 1) thereby enabling messages to be sent via the internet or via other communication channel to remote devices such as cellular telephones and instant messaging systems.

The system may be configured to forward or relay messages to a predetermined device, to a predetermined group of devices and/or to all devices. To support sending messages to a predetermined device, a unicasting mechanism is employed. To support sending messages to a predetermined group of devices a multicasting mechanism is employed. To support sending messages to a all devices a broadcasting mechanism is employed.

In a presently preferred embodiment the emergency alert service may be implemented using the following data structures:

1. Notification device priority list: A list of devices to which the alert must be forwarded. This list could be different for different time of the day. This will consist of at least
   a). The device name/address
   b). Capabilities of the device
   c). Acknowledgment required or not
   d). Acknowledgment wait time
   e). Means of delivery: channel information if the device needs to be reached by a wireless channel, the protocol to be used like SIP for delivery to a mobile phone, etc.

Figure 3:
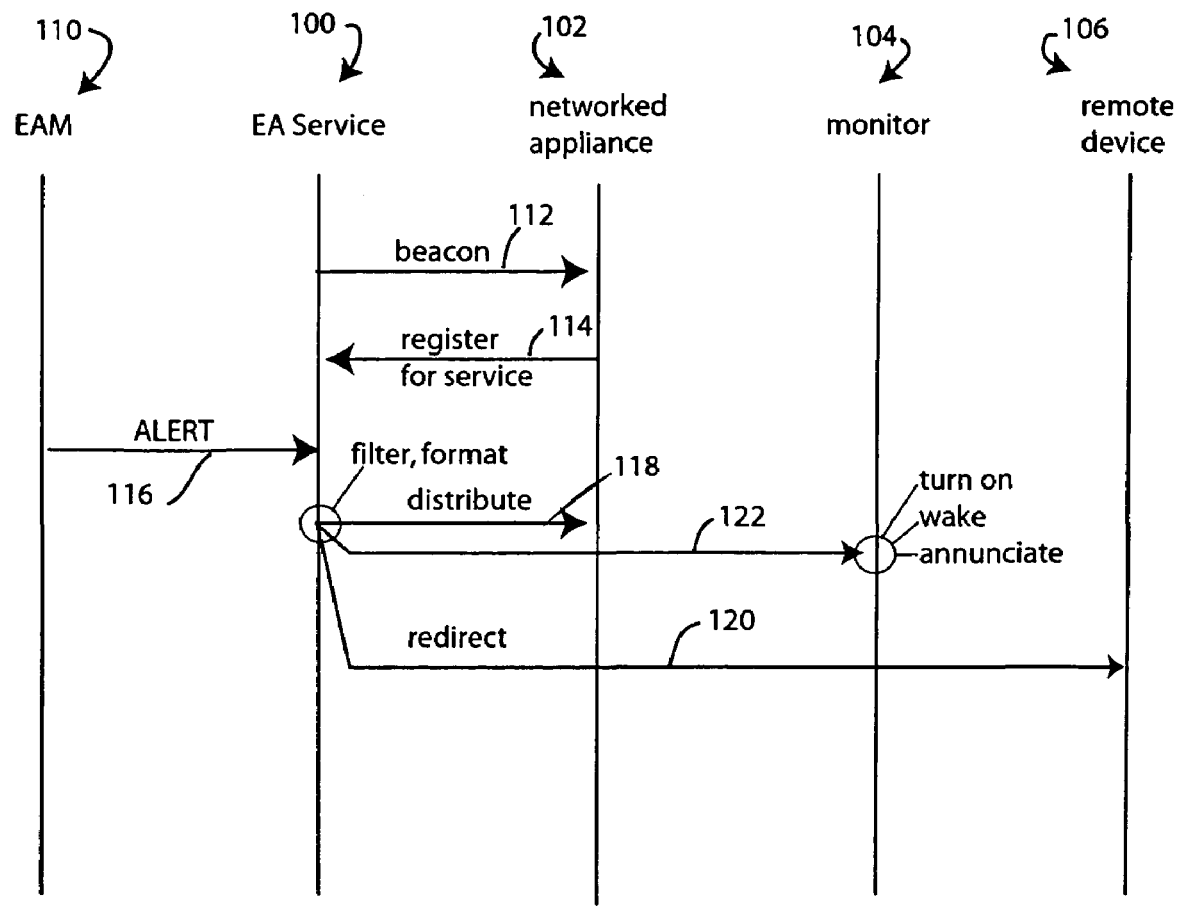
FIG. 3 is a sequence diagram illustrating the registration process and subsequent message handling performed by the emergency alert service.

2. Alert levels: A list of alerts the user is interested in knowing about and their level. Each level has predefined behavior; for example: the highest-level alerts should be sent to all the devices in the priority list. This consists of:
   a). Alert name
   b). Level assigned by the user to this specific alert
3. Behavior list: The behavior expected from the emergency alert service for each of the alert levels While there are a variety of different ways that the emergency alert service may be used, FIG. 3 illustrates an example of the emergency alert service of FIG. 2 in use. FIG. 3 is a sequence diagram that illustrates how messages are passed between different components within the system. The emergency alert service of the invention is shown generally by the timeline 100. An exemplary network appliance is shown by the timeline 102. A monitor associated with the receiver that initially receives the emergency alert message (EAM) is illustrated by the timeline 104. Such a monitor was illustrated in FIG. 1 at 20. A remote device, such as a cellular telephone, instant messaging system, or other device accessible via a gateway is shown by timeline 106. The emergency alert message itself is shown by timeline 110.

In an exemplary application, the emergency alert service (timeline 100) periodically sends a beacon message 112 to the network appliances (timeline 102). The networked appliances then register for the emergency alert service as depicted by registration message 114. Thereafter, when an alert message is received as at 116, the alert message is processed using the modules illustrated in FIG. 2 and then distributed or redirected. Thus alert messages are filtered, formatted and distributed to networked appliances at 118 and also optionally redirected to remote devices as at 120. In addition to the message handling functions, the invention can also be configured to provide device control features. Such an application is illustrated in FIG. 3 at message 122, which serves as a turn-on or wake-up message to the monitor device (timeline 104). By sending message 122, the emergency alert service is able to turn on or wake up the monitor associated with the receiver (receiver 12 and monitor 20 of FIG. 1) so that the broadcast message will be annunciated. Because of the system's message filtering and formatting capabilities, messages can be screened, based on alert level attribute, so that only those of sufficiently high importance will turn on the monitor.

In many emergency alert applications, it is primarily important to ensure that alert messages reach the user in a timely fashion. Thus the emergency alert service of the invention is preferably configured to supply messages in a variety of formats and to a variety of different networked devices in a potentially redundant fashion. While some devices are more suited to communicating information than others, the emergency alert service of the invention ensures that the emergency alert is communicated by a message of at least minimal information content. In some instances, the information content may be necessarily restricted due to limitations of a particular user or the user's environment. For example, if the emergency alert service is implemented in the home of a deaf person, flashing the home lighting is a far more effective way of communicating the alert than one that relies upon sound.

Where the system is configured to flash lights for deaf people, patterns of flashing lights based on the alert level attribute may be implemented. For example, if the warning level is 3, the lights may flash three times, followed by a long pause and then a repeat. A warning level of 2 would flash the lights two times, followed by a long pause, and a repeat.

While delivery of alert messages in real time is a primary goal of the emergency alert service, the service is configured to allow convenient replay of previously sent messages. Such feature is very convenient where the user may be interested to know whether any emergency alert conditions were broadcast while he or she was away. The system provides this capability through the message data buffer 50. The message data buffer can be configured to store incoming EAM messages in association with a date and time stamp that is provided by the system processor on which the emergency alert service has been implemented, or via an alternate date and time source on the network or from the information channel through which the EAM message arrived. The user can access the message data buffer utilizing a replay feature that may be included in the distribution list access module 60. This will cause any previously saved messages to be rebroadcast to the selected devices, under the user's direction and control. In this way, an alert condition that was broadcast while the user was away can be replayed so that the user can learn of the particulars.

The emergency alert service of the invention offers many advantages. Among these, the emergency alert message is not lost if the monitor is switched off or if the receiver is in standby mode. The emergency alert service can actively switch on the monitor if it is off. In addition, the emergency alert service can put the receiver in full power mode in order to process and/or display the EAM. The system can intelligently track the user and deliver the EAM in an appropriately format, no matter where the user is (in the home network or outside of the home network). Depending upon the alert level and/or user preference, the alert message may be unicast to a preferred list of appliances in a preferred format for each. Depending on the alert level and/or upon user preferences, the message may be broadcast to a preferred list of appliances in a preferred format. The system can perform format conversion such as transcoding, in order to accommodate the capabilities of each appliance. Text-to-speech conversion may be used, which can be helpful to aid visually impaired users understand the content of text messages. The system can map the warning level in blinking lights to notify the deaf of different emergency alert levels.

While the invention has been described in its presently preferred embodiments, it will be understood that the invention is capable of modification without departing from the spirit of the invention as set forth in the appended claims.

What is claimed is:

1. An emergency alert system comprising:
    an emergency alert service-providing system adapted to receive emergency alert messages from an alert message source and configured to communicate with networked appliances over a network;
    said emergency alert service-providing system being configured to selectively relay said received emergency alert messages to said networked appliances based on registration information received from said networked appliances.

2. The emergency alert system of claim 1 wherein said emergency alert service-providing system includes message filtering system to selectively screen said received emergency alert messages so that selected ones of said received emergency alert messages are relayed to said networked appliances.

3. The emergency alert system of claim 1 wherein said received emergency alert messages are provided by a broadcast source.

4. The emergency alert system of claim 1 wherein said emergency alert service-providing system generates a beacon message to which said networked appliances respond in order to register with said emergency alert service-providing system.

5. The emergency alert system of claim 1 wherein said emergency alert service-providing system includes message formatting system to selectively format said received emergency alert messages so that at least some of said received emergency alert messages are altered in format based on the capabilities of at least one of said networked appliances.

6. The emergency alert system of claim 1 wherein said emergency alert service-providing system is further configured to provide control signals to a monitor appliance adapted for monitoring said received emergency alert messages.

7. The emergency alert system of claim 6 wherein said control signals comprise a monitor turn-on signal operative to energize said monitor appliance.

8. The emergency alert system of claim 6 wherein said control signals comprise a monitor wakeup signal operative to awake said monitor appliance from a sleep condition.

9. The emergency alert system of claim 1 wherein said emergency alert service-providing system is further configured to provide signal redirection service whereby said received emergency alert messages are relayed to a remote device that is not in direct networked communication with said network.

10. The emergency alert system of claim 9 wherein said remote device is a telecommunication device.

11. The emergency alert system of claim 9 wherein said remote device is a cellular telephone.

12. The emergency alert system of claim 9 wherein said remote device is an instant messaging system.

13. The emergency alert system of claim 9 wherein said remote devices is a home network device.

14. The emergency alert system of claim 1 wherein said emergency alert service-providing system is further configured to provide signal redirection service whereby said received emergency alert messages are relayed to an instant messaging system.

15. The emergency alert system of claim 1 wherein said networked appliance is selected from the group consisting of television, microwave, home automation controller, home entertainment system, kitchen appliance, and telephone system.

16. The emergency alert system of claim 1 further comprising a configuration mechanism that adapts said emergency alert message to a predetermined device.

17. The emergency alert system of claim 1 further comprising a configuration mechanism that adapts said emergency alert message to a particular user.

18. The emergency alert system of claim 1 wherein said networked appliance is a lighting control system adapted to provide emergency alert messages by flashing controlled lighting in a predetermined way.

19. The emergency alert system of claim 1 wherein said emergency alert service-providing system is implemented using a processor disposed within a device associated with said network.

20. The emergency alert system of claim 19 wherein said processor is disposed within a receiver adapted to receive said emergency alert message.

21. The emergency alert system of claim 1 wherein said emergency alert service-providing system is implemented using plural processors disposed on a plural devices associated with said network.

22. The emergency alert system of claim 1 further comprising unicasting mechanism that causes said received emergency alert message to be sent to a predetermined device.

23. The emergency alert system of claim 1 further comprising multicasting mechanism that causes said received emergency alert message to be sent to a predetermined group of devices.

24. The emergency alert system of claim 1 further comprising broadcasting mechanism that causes said received emergency alert message to be sent to all devices communicating with said network.

* * * * *